US 8,340,481 B2

United States Patent
Levinson

(10) Patent No.: US 8,340,481 B2
(45) Date of Patent: Dec. 25, 2012

(54) OPTICAL BUS

(75) Inventor: Frank Levinson, The Centris (SG)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 13/225,212

(22) Filed: Sep. 2, 2011

(65) Prior Publication Data

US 2011/0318000 A1 Dec. 29, 2011

Related U.S. Application Data

(62) Division of application No. 11/468,706, filed on Aug. 30, 2006.

(60) Provisional application No. 60/712,702, filed on Aug. 30, 2005, provisional application No. 60/741,175, filed on Nov. 30, 2005.

(51) Int. Cl.
*G02B 6/26* (2006.01)
*G02B 6/42* (2006.01)

(52) U.S. Cl. ........ 385/31; 385/14; 385/24; 385/42; 385/44; 385/50; 398/135; 398/139

(58) Field of Classification Search .......... 385/31, 385/14, 24, 42, 44, 50; 398/135, 139
See application file for complete search history.

(56) References Cited

U.S. PATENT DOCUMENTS

| | | | |
|---|---|---|---|
| 4,314,740 A | | 2/1982 | Bickel |
| 4,351,585 A * | | 9/1982 | Winzer et al. .................. 385/44 |
| 4,459,591 A | | 7/1984 | Haubner et al. |
| 5,037,172 A * | | 8/1991 | Hekman et al. ................ 385/31 |
| 5,390,266 A | | 2/1995 | Heitmann et al. |
| 5,684,899 A * | | 11/1997 | Ota ................................. 385/24 |
| 5,754,941 A | | 5/1998 | Sharpe et al. |
| 6,038,355 A * | | 3/2000 | Bishop ........................... 385/14 |
| 6,456,381 B1 | | 9/2002 | Nakamura et al. |
| 7,050,665 B2 | | 5/2006 | Harres et al. |
| 2003/0081321 A1 | | 5/2003 | Moon et al. |
| 2003/0113067 A1 | | 6/2003 | Koh et al. |
| 2003/0223756 A1 | | 12/2003 | Tatum et al. |
| 2004/0208600 A1 | | 10/2004 | Guenter et al. |
| 2005/0135742 A1* | | 6/2005 | Basavanhally et al. ........ 385/33 |

FOREIGN PATENT DOCUMENTS

EP    1977278 A    11/2006
WO    WO/2007/065136    6/2007

OTHER PUBLICATIONS 200680045142.3, CN, Feb. 9, 2011, Office Action.
200680045142.3, CN, Feb. 22, 2012, Office Action.
International Search Report mailed Sep. 22, 2008 for related PCT Publication No. WO/2007/065136.

* cited by examiner

*Primary Examiner* — Brian M. Healy
*Assistant Examiner* — Mary El Shammaa
(74) *Attorney, Agent, or Firm* — Maschoff Gilmore & Israelsen

(57) ABSTRACT

An optical bus. Optical sub-assemblies are used to connect lengths of optical fiber to form a single optical fiber that is a bus. A master transceiver may be connected to one end of the fiber and nodes can be connected to the optical sub-assemblies. Each optical sub-assembly includes a center fiber with a mirror that enables each connector to reflect optical signals out of the fiber and that enables a node to launch optical signals on the optical bus. The optical bus can also be connected with a second transceiver that may be used to deliver optical power to the attached nodes. Some nodes include two optical subassemblies to enable bidirectional communication on the optical bus.

22 Claims, 5 Drawing Sheets

OPTICAL BUS

CROSS-REFERENCE TO RELATED APPLICATIONS

This application is a division of U.S. patent application Ser. No. 11/468,706 filed Aug. 30, 2006 and entitled Optical Bus, which claims the benefit of U.S. Provisional Application Ser. No. 60/712,702 filed Aug. 30, 2005 and entitled OPTICAL BUS and claims the benefit of U.S. Provisional Application Ser. No. 60/741,175 filed Nov. 30, 2005, which applications are incorporated herein by reference in their entirety.

BACKGROUND OF THE INVENTION

1. The Field of the Invention

The present invention relates to the field of optical communication and optical links. More particularly, embodiments of the invention relate to an optical bus and to an optical sub assembly used in an optical bus.

2. The Relevant Technology

When people think of computers, conventional desktop systems and laptop computers often come to mind. Common uses of computers include school or work related issues. Upon further reflection, however, it becomes clear there are many different types of computers that are used directly or indirectly by people every day. Often, these computers are part of a system that monitors or controls peripheral components.

For example, there are many systems operating today that are computer controlled. Often, these computer systems are connected with external components that are used for varying purposes such as data collection or data output. A computer, for example, may be connected with multiple sensors. The data provided by these sensors can be collected and evaluated by the computer. The evaluation of the collected data can lead to certain actions in the system. Cars, for example, typically include a computer to monitor various aspects of the car's operation. Monitoring the car's operations is achieved using sensors that provide data to the computer or that provide a signal back to the computer indicating that a certain condition is true or false.

A car's braking system, air bag deployment system, traction control system, and the like are examples of the car's operation that are monitored and/or controlled by a computer. By monitoring these aspects of the car's operations, the car is able to provide certain benefits to the occupants. The computer can ensure, for example, that the brakes do not lock, that the air bags deploy in an accident, that the wheels do not slip, and the like or any combination thereof.

The ability of a computer to interact with remote sensors or other peripherals of a system or to interact with other computers often requires a bus or other communication path. The bus includes the wires that are needed to ensure that the computer can communicate with the peripheral device. Generally stated, a bus is a group of electrical lines that are used to transmit control information as well as data. The use of wires in the bus, however, begins to present problems as the number of peripheral devices increases.

For example, a control module may interface with multiple sensors or other peripheral devices. Typically, at least three wires are required for each device. Two of the wires provide power and ground. The third wire typically carries a control and/or data signal to and from the device. In some cases, two wires are used to convey the signal to and from the device. As the number of peripheral devices increases, the number of wires needed for the bus has a corresponding increase. It is likely, therefore, that a given bus between a control module or computer and its peripheral devices may require hundreds of wires. The large number of wires makes the system large and unwieldy, difficult to troubleshoot, and the like. Further the ability to expand or make improvements to such a system is difficult in view of the system's size and complexity.

One of the alternatives to an electrical wire bus is to utilize optical links. In conventional systems, optical links have certain advantages that are not present in wire based links. Advantages of optical links include, for example, wide bandwidth, low loss, electromagnetic immunity, and the like. These advantages often make an optical system preferable to an electrical system.

However, optical based systems also have certain limitations. Optical links are point to point links, which means that two transceivers are required for each link. This further suggests that two optical fibers are also required for each link if bidirectional communication is desired. Systems that are based on optical point to point links require 2N transceivers where N is the number of links in the system. In D WHW practical terms, implementing a conventional optical bus may require a control module or computer to have a separate transceiver for each of the peripheral devices.

As a result, an optical system is soon faced with some of the same problems that are present in an electrical bus as discussed above. What is needed is an optical bus and/or an optical sub assembly that can reduce the number of transceivers required for an optical system as well as reduce the number of fibers that would be included in the system.

BRIEF SUMMARY OF THE INVENTION

These and other limitations are overcome by embodiments of the invention which relate to an optical bus and to optical sub-assemblies that connect nodes (e.g., peripheral devices, sensors) to the optical bus. The optical sub-assemblies enable lengths of optical fibers to be connected to effectively form a single optical fiber. A master transceiver connected to one end of this fiber can then communicate with each of the nodes that are connected to the optical bus by the optical sub-assemblies.

In one embodiment, an optical bus is disclosed for connecting multiple nodes, the optical bus includes a master transceiver that is connected with the optical fiber that serves as the bus. As previously stated, the optical fiber serving as the bus may include a series of discrete optical fibers that are appropriately connected. For example, optical assemblies (also referred to herein as connectors or optical sub-assemblies) connect lengths of optical fiber and also connect nodes to the optical bus. The optical sub-assemblies enable the discrete lengths of optical fibers to be connected such that adequate optical coupling occurs at each fiber to fiber interface.

Each node that connects to the optical bus via the optical assembly typically has a transceiver. Alternatively, the transceiver can be included as part of the optical assembly. Each connector typically includes a center fiber that includes a mirror or a mirror portion. The mirror is used to reflect optical signals in the fiber to the node's transceiver and to reflect signals from the node's transmitter into the fiber. The fiber used in the bus has a large core in one embodiment. In one embodiment, the core may be square with rounded corners to facilitate rapid mode mixing.

The connectors are structured to align the discrete optical fibers that form the optical bus. In this optical bus, the communication can be full duplex, half duplex, bidirectional, and single or multi wavelength. In addition, another power transceiver can also be connected to the bus such that optical power can be delivered to the nodes over the optical bus.

Additional features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SEVERAL EMBODIMENTS

Embodiments of the invention relate to an optical bus and more particularly to an optical sub-assembly or connector that can be used in an optical bus or that can be used to connect discrete optical fibers to form an optical bus. The optical sub-assemblies of the present invention are configured such that optical cabling between nodes of the bus can plug in to the optical sub-assemblies. The optical sub-assemblies enable a given node to both transmit and receive data over the optical bus. Some embodiments enable bidirectional communication over the fiber. With the optical sub-assemblies or connectors, an optical bus can be formed using optical fibers that are connected as if formed from a continuous optical fiber. The optical bus is also passive such that the failure of a particular node does not fail the entire optical bus.

Embodiments of the invention can be used, by way of example and not limitation, in military applications, marine applications, automotive applications, sensing applications, and the like or any combination thereof. The architecture of an optical bus can be integrated with electronics. Systems based on the optical bus may have, by way of example, N nodes. Advantageously, only N+1 transceivers are needed in one embodiment for an optical bus with N nodes rather than 2N transceivers typically required in conventional systems. In another embodiment, N transceivers can be included in a bus with N nodes.

In one example, an optical sub-assembly includes a transceiver as well as an integrated connector. In this configuration, the optical cabling only needs to be plugged in between the connectors of the sub-assemblies used to connect the nodes to the bus. The optical bus formed in this manner, which can be viewed as a single optical fiber even though it may be formed from discrete fiber portions, is assembled by connecting optical fiber from one optical sub-assembly to the next optical sub-assembly. As previously indicated, the optical sub-assemblies are passive and the failure of a particular node does not fail the remaining nodes on the optical bus.

Figure 1:
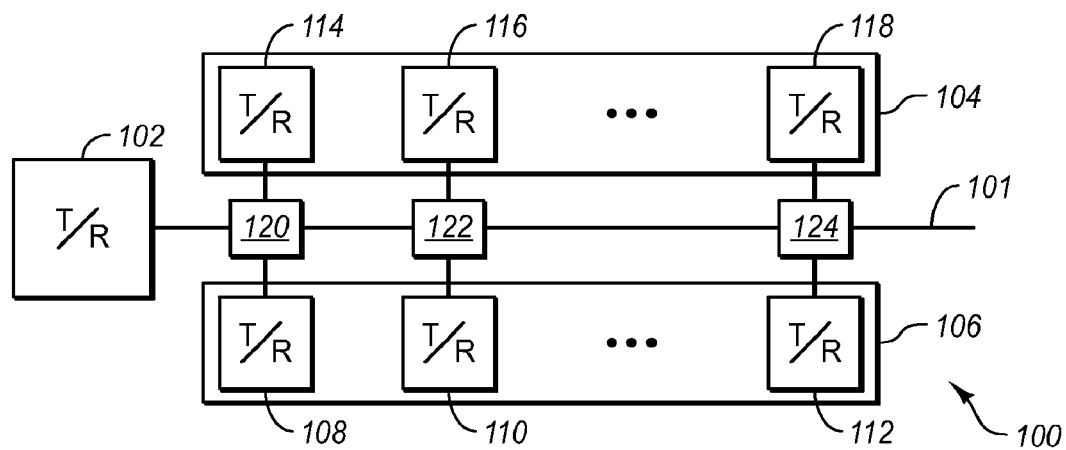
FIG. 1 illustrates an exemplary optical bus that connects multiple nodes to a single optical fiber.

FIG. 1 illustrates one embodiment of an optical bus, designated generally as bus 100. The bus 100 includes an optical cable or fiber 101 that is connected with a master transceiver 102. The master transceiver 102 typically connects with a host system that includes a processor for processing the data transmitted and/or received over the optical bus. The optical fiber 101 is assembled by connecting lengths of optical fiber between the connectors 120, 122, and 124. Alternatively, the optical fiber 101 is an unbroken fiber and the connectors 120, 12, and 124 can be connected to the optical fiber 101. The transceivers disclosed herein may also include optics such that light received over the fiber is directed to the receiver portion of the transceiver and light emitted by the transmitter portion of the transceiver is launched in the optical fiber of the bus.

The bus 100 can be connected to the nodes 104 and/or nodes 106 using the connectors 120, 122, and 124. In one example, the nodes 104 are configured for communication in one direction while the nodes 106 are configured for communication in another direction. In another embodiment, nodes may only be able to communicate with the master transceiver 102, while in other embodiments, a particular node can communicate with any other node connected to the bus 100 in addition to the master transceiver 102. In some instances, the communication of a particular node on the bus with another node on the bus may require the use of an intermediary transceiver. For instance, the node 108 may communicate with the node 118 through the master transceiver 102.

The connectors 120, 122, and 124 are examples of optical sub-assemblies used to connect the transceivers 108, 110, 112, 114, 116, and 118, which are examples of the nodes 104, 106, to the optical bus 100. The transceivers may be an integral part of a peripheral device such as a sensor, for example.

As previously mentioned, the optical fiber 101 may be formed as lengths of optical cable are plugged into the connectors serially. While the fiber 101 may be physically separated fibers, the fiber 101 functions as if it were an unbroken fiber as described in more detail below. The connectors 120, 122, and 124 enable light to pass through such that the light is available to other nodes on the bus. At the same time, the connectors 120, 122, and 124 also enable the nodes 104, 106 to extract and launch light on the fiber 101.

Each of the transceivers including the master transceiver 102 typically have both a transmit assembly and a receiver assembly. The receiver assemblies of the transceivers are used to detect optical signals carried by the optical bus 100 and the transmit assemblies are used to launch optical signals onto the bus 100. The optical fiber 101 therefore carries all of the signals generated by the transceiver 102 and by the various nodes 104 and 106. The communication on the bus 100 can be full duplex, half duplex, bidirectional, use one or more wavelengths, and the like or any combination thereof.

As illustrated in FIG. 1, the optical bus 100, in addition to the master transceiver 102, has a transceiver for each link or node. As previously described, conventional point to point links require 2 transceivers for each link. Embodiments of the invention may require one transceiver per link or node in addition to the master transceiver. In addition, the fiber 101 may be terminated in one embodiment. Further all of the links can transmit and receive over the same optical fiber 101 in one embodiment.

Figure 2A:
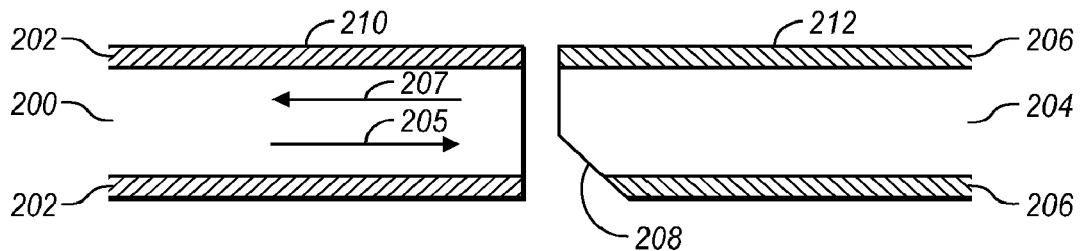
FIG. 2A illustrates one embodiment of an optical fiber that includes a mirror used to extract and launch optical signals in an optical fiber.
Figure 2B:
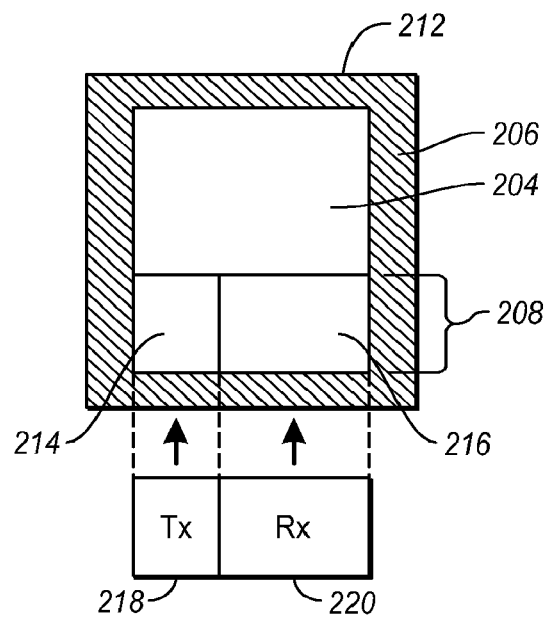
FIG. 2B illustrates an end view of a square fiber and illustrates the area of a mirror that may be used to launch an optical signal in an optical fiber as well as the area of a mirror that may be used to receive an optical signal from the optical fiber.

FIGS. 2A and 2B illustrate an exemplary portion of an optical fiber that is used in an optical bus. The portion 199 illustrated in FIG. 2A may be present at or included in, for example, each of the connectors 120, 122, and 124. The portion 199 enables light to pass through a connector and enables light to be extracted/launched by a node connected to the fiber at the portion 199. Allowing light to pass through a given connector enables other nodes further down the bus to have optical communication on the optical bus.

FIG. 2A illustrates a fiber 210 that is aligned with a fiber 212. An angled mirror 208 has been formed on the fiber 212. The mirror 208 is located at an end or edge of the fiber 212 such that an optical signal carried by the fibers 210 and 212 can be extracted from the fiber or launched into the fiber using reflection. Typically, the mirror 208 is formed on the end of the fiber 212 and polished. The mirror 208 may also be coated in some examples with coatings that are wavelength specific. For example, certain wavelengths may be reflected by the mirror 208 while other wavelengths pass through the mirror 208.

In one embodiment, the fibers 210 and 212 are a continuous fiber with no break and the mirror 208 can be formed in the continuous fiber. The mirror 208 may be formed by creating a tap in the continuous fiber that enables light to be appropriately reflected as described. FIG. 3D, for example, illustrates a continuous fiber 390 with a vampire tap 392 formed therein. The tap 392 can act as a mirror to reflect the light in a manner similar to the mirror 208.

In this example, the core 200 of the fiber 210 is surrounded by the cladding 202 and the core 204 of the fiber 212 is surrounded by the cladding 208. Light transmitted in the fibers 210, 212 can be extracted from and/or introduced into the fibers 210, 212 using the mirror 208. Light traveling in the direction of arrow 205 is reflected out of the fiber by the mirror 208 or the tap 392 illustrated in FIG. 3D. Light traveling towards the master transceiver in the direction or arrow 207 was reflected into the fiber by the mirror 208.

FIG. 2B is an end view of the fiber 212. The core 204, as discussed above is surrounded by the cladding 206. In one embodiment, the fiber 212 is constructed with a square core 204, although the corners or the core 204 may be rounded. An essentially square core facilitates rapid mode mixing. This fills the fiber with light in one embodiment and ensures that light can be extracted from the optical bus using the mirror 208. The fiber 212, by way of example only and not limitation, may be a 200/220 fiber such that the core 204 has a width of 200 microns.

The mirror 208 is used to extract and transmit optical signals in the fiber 212. The portion 214 of the mirror 208 can be used by the transmitter 218 to launch an optical signal in the fiber and the portion 218 of the mirror 208 may be used by the receiver 220 to receive an optical signal from the fiber. By way of example and not limitation, the area of the portion 214 may be 400 microns (20 microns.times.20 microns) and the area of the portion 216 may be 3600 microns (180 microns.times.20 microns).

If the transmitter 218 uses a vertical cavity surface emitting laser (VCSEL), then it can inject an optical signal into the portion 214 with a high numerical aperture (NA). As a result, the portion 214 affords a high launch efficiency that is nearly 100%. The receiver 220 that couples light out of the fiber 212 uses, in this example, 90% of the output of the mirror 208. The photodiode used by the receiver 220 can be shaped to accommodate the shape of the portion 216. This can maximize the amount of light that is detected by the photodiode in the receiver 220. In addition, the VCSEL in the transmitter 218, the photodiode in the receiver 220 as well as any monitoring photodiodes can be formed on the same substrate. One of skill in the art can appreciate that other dimensions and shapes for the portions 214 and 216 may be utilized.

The receiver 220 can read the entire signal carried in the fiber 212 by only tapping a portion of the core 204. In addition, it is possible to launch optical light with full power both at the master transceiver and at any of the nodes in the optical bus using only a small portion of the core 204 as illustrated in FIG. 2B.

Figure 3A:
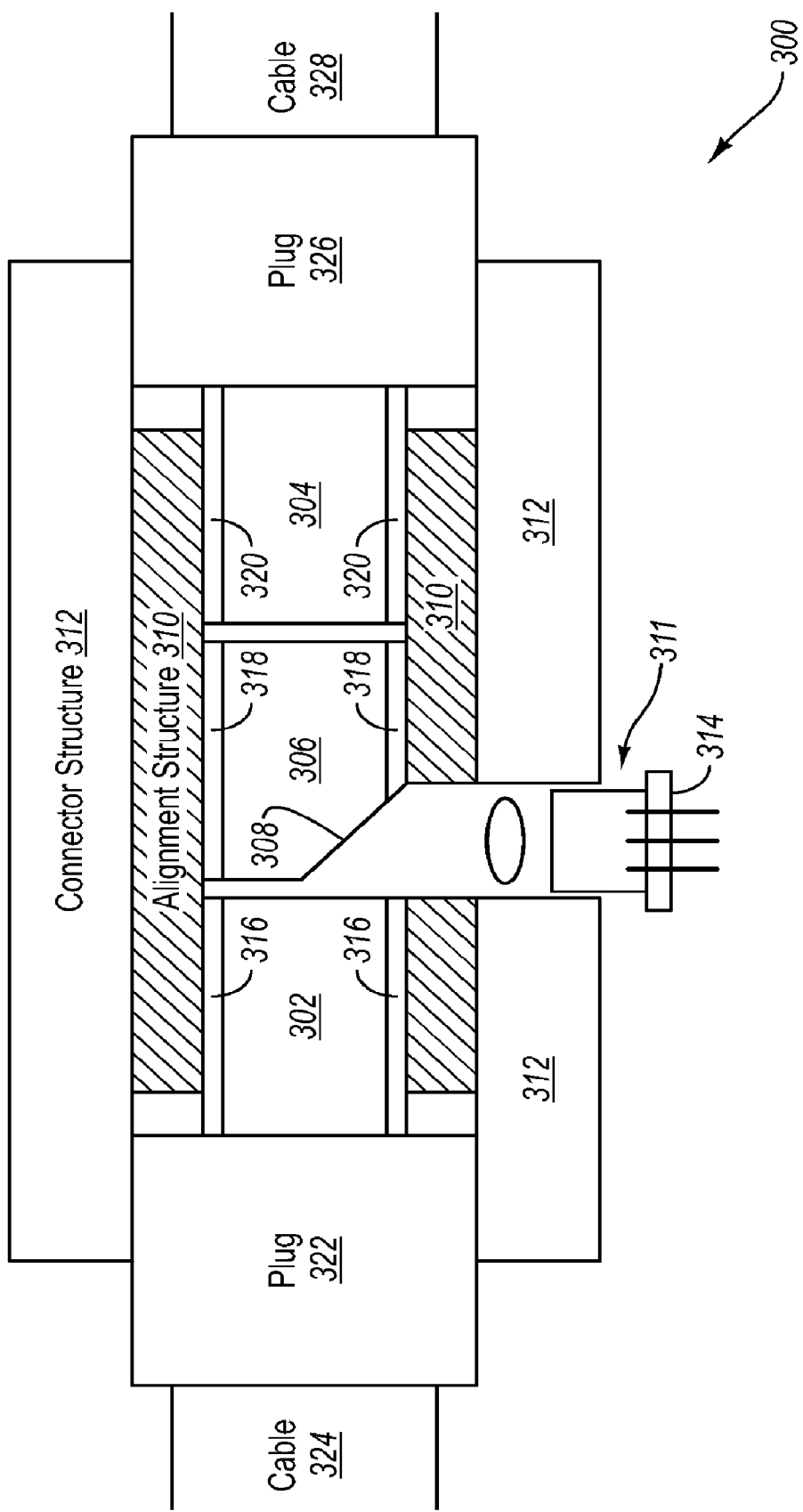
FIG. 3A illustrates an one embodiment of a connector that provides the structure for connecting a node to an optical bus such that the node can transmit and receive optical signals over the optical bus.

FIG. 3A illustrates an embodiment of a connector 300 that may be used in an optical bus such as the bus 100 shown in FIG. 1. The connector 300 is one embodiment of an optical sub-assembly. The connector can be integrated with a transceiver or adapted such that the transceiver can be connected to the optical sub-assembly. The connector 300 includes a connector structure 312 that serves as a housing or body for the connector 300 in this example. The cable 324 has a plug 322 that removably connects with the connector 300, for example, at connector structure 312. Similarly, the cable 328 includes a plug 326 that removably connects with the connector 300 at, for example, the connector structure 312. The cables 324 and 328 can be permanently secured to the connector 300 if desired.

The cables 324 and 328 each house an optical fiber 302 and 304, respectfully. The fibers 302 and 304 extend from the plugs 322, 326 such that when the cables 324, 328 are fully inserted in the connector 300, the ends of the fibers 302 and 304 are adjacent the fiber 306 such that the fibers 302 and 304 can optically couple with the fiber 306. This arrangement enables the optical bus to function as if the fiber were a single continuous fiber.

An alignment structure 310 is mounted to the inside of the connector structure 312 and guides the fibers 302 and 304 as the fibers 302 and 304 are inserted or otherwise connected into the connector 300. To facilitate the appropriate positioning of the fibers 302 and 304, the alignment structure may also have fiber stops.

The alignment structure 310 ensures that the fibers 302 and 304 are properly positioned with respect to the fiber 306. This proper alignment of the fibers 302 and 304 with the fiber 306 ensure that light couples efficiently between the fibers 302, 304, and 306.

In one embodiment, the alignment structure 310 may have beveled edges such that the fibers 302 and 304 can be more easily inserted into the connector 300. The fiber 306 is typically polished and has an angled face forming the mirror 308. The mirror 308 is angled to couple light to and from the fibers 302 and 304. In other embodiment, the connector structure 312 may be configured to couple with existing form factors.

Although FIG. 3A illustrates that the fiber 306 is physically distinct from the fibers 302 and 304, the fiber 306 may alternatively be an continuous part of the fiber 304, for example. In either case, the end of the fiber 306 has an angled face to form a mirror 308 or a reflective surface as previously described.

The alignment structure 310 may include structural stops such that the angled face 308 or mirror is appropriately positioned within the structure 300 and with respect to the transceiver 314. In another embodiment, the fibers 302, 306, and 308 are a single continuous fiber. In this case, the mirror 308 is formed in the fiber as shown, for example, in FIG. 3D.

The connector 300 also includes a mounting location 311. The mounting location 311 may include a lens 330 situated therein or the lens may be integrated with the transceiver 314. The mounting location 311 serves to couple the connector 300 with the transceiver 314. The transceiver can be an integral part of the connector 300 or be removably attached to the connector 300 at the mounting location 311. The lens 330 couples the light from the fiber 306 to the receiver of the transceiver 314 and/or from the transmitter of the transceiver 314 to the fiber 306.

Figure 3B:
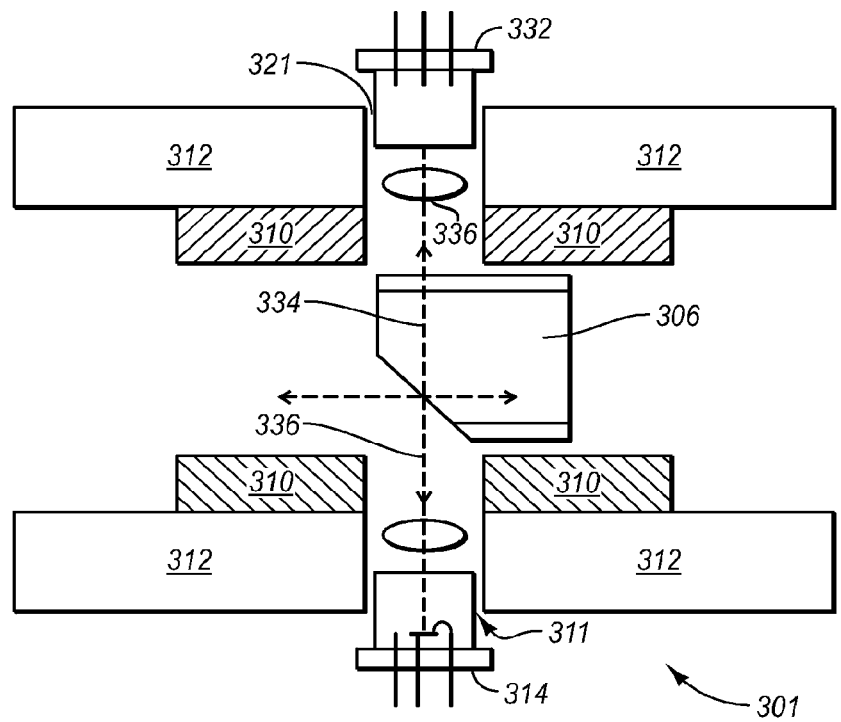
FIG. 3B illustrates another embodiment of a connector that provides the structure for connecting more than one node to an optical bus such that each node can transmit and receive optical signals over the optical bus.

FIG. 3B illustrates another embodiment of a connector 300. In this case, the connector 301 is substantially identical to the connector 300 in FIG. 3A. The connector 301, however, includes a second mounting location 321 that enables a second transceiver 332 to be mounted or attached to the connector 301. A lens 336 may be used to couple light between the fiber 306 and the transceiver 332.

The dashed line 336 in FIG. 3B illustrates the path of light that occurs on the bus between a master transceiver, other nodes, and the transceiver 314. The dashed line 334 indicates the path of light that occurs on the bus between a master transceiver, other nodes, and the transceiver 332. In another example, the fiber 306 may include a second mirror 338 that is located opposite the mirror 308.

The optical bus along with the various configurations of the connector 300, enable the bus to be used in various situations. Some embodiments are full duplex, bidirectional, and use two or more wavelengths of light. Other embodiments may be half duplex, bidirectional, and use a single wavelength of light.

Figure 3C:
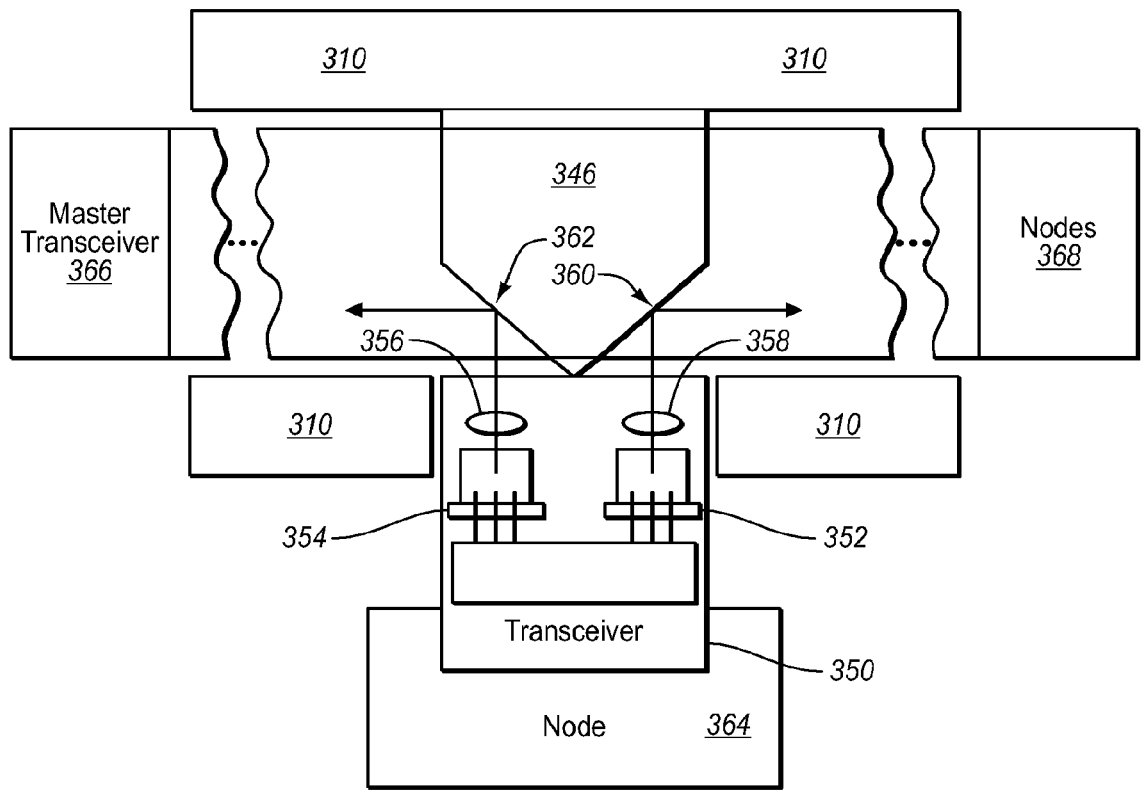
FIG. 3C illustrates another embodiment of a connector that enables bidirectional communication using a single wavelength.
Figure 3D:
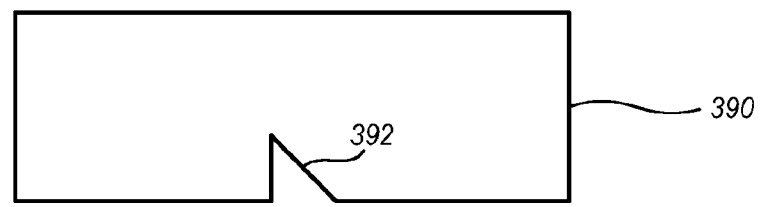
FIG. 3D illustrates an exemplary tap formed in a continuous fiber to launch or extract light from a continuous fiber.

FIG. 3C illustrates another embodiment of a connector. In this example, the alignment structure 310 is shown along with the center fiber 346. In this example, the fiber 346 includes a mirror 362 on one side and a mirror 360 on the other side. The optical bus couples with a node 364 through a transceiver 350. In this example, the transceiver 350 includes an optical assembly 354 that includes both a transmitter and a receiver and an optical subassembly 352 that includes both a transmitter and a receiver.

This embodiments enables the node 364 to communicate with the master transceiver 366 and other nodes between the node 364 and the master transceiver 366 as well as nodes 368 that are further away from the master transceiver. The optical subassembly uses the mirror 362 to receive and transmit optical signals with the master transceiver 366 and uses the mirror 360 to communicate optical signals with the downstream nodes 368. In this manner, the node 364 can transmit/receive signals traveling both directions in the optical bus.

Figure 4:
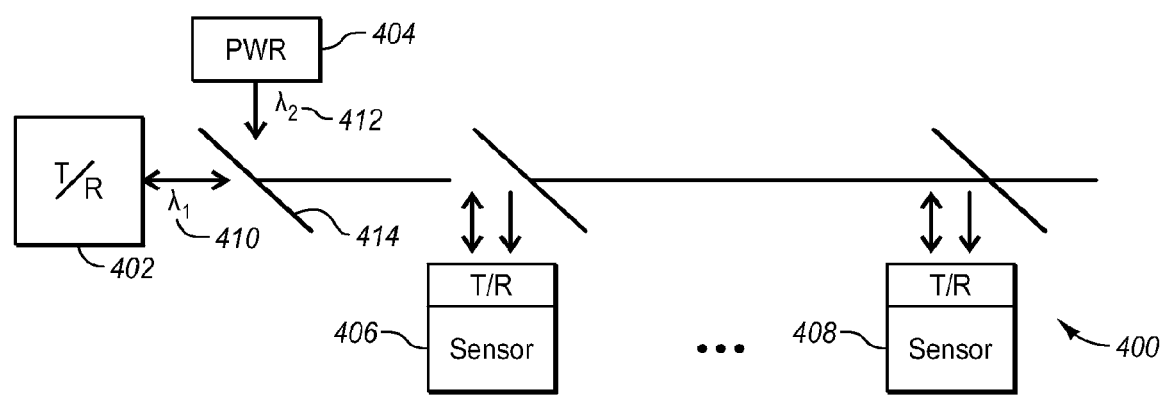
FIG. 4 illustrates one embodiment of an optical bus where optical power can also be delivered to nodes connected with the optical bus in addition to data.

FIG. 4 illustrates one embodiment of an optical bus that can accommodate multiple sensors. The bus 400 includes a transceiver 402 that generates a first wavelength 410. The wavelength 410 can be transmitted on the bus 400 to one or more of the sensors 406 and 408. Each sensor 406, 408 includes a transceiver that enables the reception and transmission of optical signals. Thus, each of the sensors 406 and 408 can also transmit data back to the transceiver 402. The sensors 406, 408 are coupled to the optical bus using embodiments of the optical sub-assemblies described herein.

The information collected by the sensors 406 and 408 is transmitted on the bus 400 back to the transceiver 402 and then to a control module, processor, or other computer (may be a general purpose computer or a special purpose computer) that analyzes the data and that may implement actions based on the data. The transceiver 402 is used to communicate, for example, control signals and/or data to and from the sensors 406 and 408.

The device 414, for example, is used such that more than one transceiver can be connected to the optical bus. The device 414 may be coated such that the wavelength 410 passes through the device 414 while the wavelength 412 is reflected by the device 414. Using the device 414, the transceiver 404 can be used to deliver optical power to the sensors 406 and 408. Therefore, optical power is delivered to the sensors 406 and 408 on the wavelength 412 (e.g., 950 nm) while data is transmitted between the transceiver 402 and the sensors 406 and 408 using the wavelength 410 (e.g., 850 nm). Alternatively, the transceiver 404 can be used to introduce another wavelength into the optical bus. As previously indicated, the connectors can include coatings or the transceivers in the nodes can include coatings to insure that the appropriate wavelength is detected and processed. This enables a control system to communicate with multiple nodes simultaneously.

If the launch power of the transceiver 404 is greater than 3 dBm, the receiver sensitivity is −22 dBm at 1 Gb/s or −42 dBm at 10 Mb/s, the practical tap loss is −0.75 dB, and the drop loss is −11 dB, an optical bus could have around 16 nodes at 1 Gb/s or about 40 nodes at 10 Mb/s. In addition, data can be transmitted on the bus 400 asynchronously and half duplex in one embodiment.

Each of the sensors 406 and 408 may include various semiconductor structures. Because, as illustrated in FIG. 2B, embodiments of the invention use a relatively larger portion 220 to extract or receive optical signals from the fiber, the receiver portion of the transceiver on the sensors 406 and 408 can be adapted for various purposes. A portion of the receiver, for instance, can be used as a detector. Another portion of the receiver may include photocells that generate current or power in the presence of light. In this example, the transceiver 404 may distribute optical power to the nodes attached to an optical bus. In this manner, the power from the transceiver 404 can be delivered to the nodes and the photocells can be tuned to the wavelength of light transmitted by the power transceiver 404. The generated current can be used to recharge a battery (if one is present on the node), provide power to a laser in the transmitter portion of the transceiver such that the sensor can transmit data back over the fiber, and the like. In one embodiment, the structure can be monolithic in nature. One example of such a structure is illustrated in U.S. Publication No. US 2004/0208600 A1 and in U.S. Publication No. US 2003/0223756 A1, which are both hereby incorporated by reference.

The power requirements (for purposes of receiving and/or transmitting) of the various nodes may depend on their position on the optical bus. Because the length of the optical bus can vary substantially (a few meters to thousands of meters, for example), the nodes can be configured in their power requirements. Nodes that are closer to the master transceiver, for example, may transmit at less power or are therefore dimmer than nodes that are further away from the master transceiver. The control can be delivered over the optical bus and be adapted dynamically. The optical power of the master transceiver can also vary depending on the location of the node that is an intended destination of data. For example, the master transceiver may transmit at a higher power for nodes that are furthest from the master transceiver on the bus while using lower transmission power for those nodes that are closer.

In one embodiment, the bus 400 is used to effectively reduce the components needed to implement multiple optical links. The link between the master transceiver 402 and the sensor 406 can occur on the same fiber as the link between the master transceiver 402 and the sensor 408. More particularly, the formation of the optical sub-assemblies, such as illustrated in FIGS. 3A and 3B, enable each of the nodes connected on an optical bus 400 to communicate with the master transceiver. Thus, the addition of more nodes to the bus does not necessarily require additional fibers or wires, but only requires another connector to the existing bus.

Figure 5:
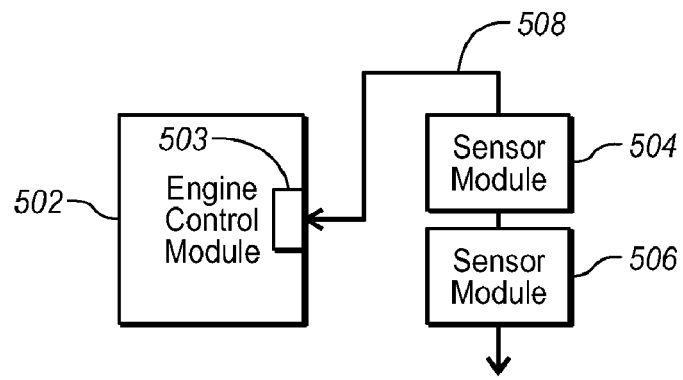
FIG. 5 illustrates one embodiment of an optical bus deployed in a sensing application.

FIG. 5 illustrates one example of a deployed system utilizing an optical bus. The system 500 includes an engine control module 502. The engine control module 502 includes a transceiver 503. In this example, the transceiver 503 may represent a transceiver used to transmit control signals and data as well as a transceiver used to deliver optical power. Thus, the engine control module 502 may include more than one transceiver that can each transmit and receive on the optical bus 508, which may only include a single optical fiber.

The optical bus 508 is connected to the sensor modules 504 and 506. Each of the sensor modules includes the bus input/output components as described above as well as control components and a sensor. The engine control module 502 can then communicate with each of the sensor modules 504 and 506. The optical bus 508 can also be configured, as discussed above, such that the sensor modules 504 and 506 can communicate with each other. The communication on the bus can be full duplex, half duplex, bidirectional, and use one or more wavelengths based the configuration of the optical bus 508 as described above. If the sensor module 504 becomes inoperable, the passive nature of the bus 508 ensures the continued functionality of the sensor module 506.

Figure 6:
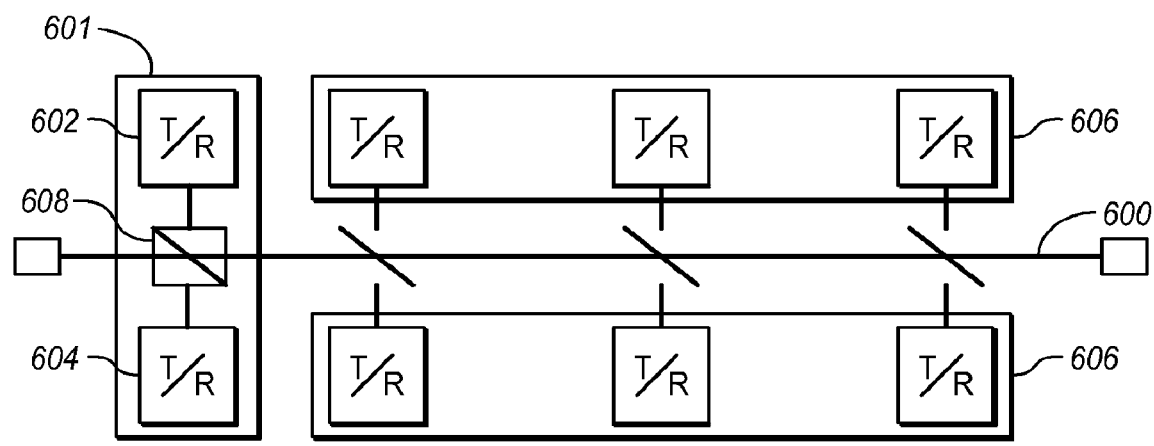
FIG. 6 illustrates another embodiment of an optical bus without a bus master.

FIG. 6 illustrates another embodiment of an optical bus where each node can communicate with other nodes on the optical bus. In this example, all of the nodes 606 are equal and connect to the optical bus 600 via a single connector. In this example, however, the node 601 includes two laser diodes and two photodiodes that are driven through the same integrated circuit. The optical bus 600 typically operates as a single wavelength and in half duplex operation. This system with the optical bus 600 further only has N transceivers, as well as distributed control and communication. This could be one implementation of a point to point link while using a single optical fiber. This may be implemented, for example, as an optical back plane. In this case, the connector 608 includes a fiber with a single mirror that enables bidirectional communication. The transmitter receiver pair 602 communicates in one direction for the transceiver 601 while the transmitter receiver pair 604 communicates in the other direction for the transceiver 601. As previously stated, both of the transmitter receiver pairs 604 and 601 are driven by the same circuitry.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical bus for connecting multiple nodes, the optical bus comprising:
   a master transceiver connected with one or more lengths of optical fiber;
   a plurality of similarly configured nodes each including a connector including one or more mounting locations coupling the connector to both a first optoelectronic device including a first transmitter and receiver pair as well as a second optoelectronic device including a second transmitter and receiver pair, the connector further including a center fiber including a mirror configured to reflect signals transmitted to and received from a first direction in the optical bus to the first optoelectronic device, the mirror further configured to reflect signals transmitted to and received from a second direction in the optical bus to the second optoelectronic device, the second direction being different than the first direction in the optical bus, wherein the optical bus operates as a point to point link while using a single length of one or more optical fibers.

2. The optical bus as defined in claim 1, wherein each connector includes two laser diodes as the transmitters and two photodiodes as the receivers that are driven through the same integrated circuit.

3. The optical bus as defined in claim 1, wherein the optical bus operates in a single wavelength in half duplex operation.

4. The optical bus as defined in claim 1, wherein the optical bus operates as a point to point link while using a single optical fiber.

5. The optical bus as defined in claim 4, wherein the optical bus operates as an optical back plane.

6. The optical bus as defined in claim 5, wherein each connector includes a fiber with a single mirror that enables bi-directional communication.

7. An optical bus for connecting multiple nodes, the optical bus comprising:
   a master transceiver connected with one or more lengths of optical fiber;
   a plurality of similarly configured nodes each including a connector including a center fiber including a mirror configured to reflect signals transmitted to and received from a first direction in the optical bus to a first transmitter and receiver pair, the mirror being configured to reflect signals transmitted to and received from a second direction in the optical bus to a second transmitter and receiver pair, the second direction being different than the first direction in the optical bus, wherein the optical bus operates as a point to point link while using a single length of one or more optical fibers, wherein each connector is connected with at least two of the lengths of the optical fiber, each connector including:
      a first center optical fiber disposed in the first connector, wherein the first center optical fiber includes a first mirror that enables a first transceiver optically coupled with the connector to receive and launch optical signals over the one or more lengths of optical fiber;
      a first connector structure having a first end that connects with a first length of optical fiber and a second end that connects with a second length of optical fiber, wherein the first connector includes a first mounting location that enables a first transceiver including the first transmitter and receiver pair to be mounted or attached to the connector and a second mounting location that enables a second transceiver including the second transmitter and receiver pair to be mounted or attached to the connector; and a first alignment structure formed within the first connector structure, wherein the first alignment structure aligns the first length of optical fiber and the second length of optical fiber with the first center fiber.

8. The optical bus as defined in claim 7, wherein the first and second transceivers are mounted or attached directly opposite to one another and substantially along a common optical axis.

9. The optical bus as defined in claim 8, wherein the first mirror reflects the optical signals of the first and second transceivers 90 degrees such that the optical signals of the first and second transceivers are transmitted in different directions along a common optical axis across the first and second lengths of optical fiber.

10. The optical bus as defined in claim 7, wherein the first and second optical transceivers are adjacent to one another on the same side of the center optical fiber.

11. The optical bus as defined in claim 10, further comprising a second mirror, the first mirror being aligned to reflect optical signals between the first transceiver and the first length of optical fiber and the second mirror is aligned to reflect optical signals between the second transceiver and the second length of optical fiber.

12. The optical bus according to claim 7, wherein the first transceiver communicates with the master transceiver and the second transceiver communicates with downstream nodes further away from the master transceiver than the node of the first and second transceiver.

13. The optical bus according to claim 7, wherein the first transceiver communicates with a node between itself and the master transceiver and the second transceiver communicates with downstream nodes further away from the master transceiver than the node of the first and second transceiver.

14. The optical bus as defined in claim 7, wherein the first and second transceivers use the same mirror for transmission and reception of optical signals.

15. The optical bus as defined in claim 7, wherein the first and second transceivers transmit and receive optical signals of two or more wavelengths of light.

16. The optical bus as defined in claim 7, further comprising a power transceiver that transmits power in an optical signal over the optical bus to each node connected to the optical bus, wherein the wavelength of the power transceiver is different from a wavelength of the master transceiver.

17. The optical bus as defined in claim 16, wherein a receiver portion of each transceiver includes photocells that generate current or power in the presence of light such that the power transceiver is delivered to each node of the optical bus.

18. The optical bus as defined in claim 7, wherein the first connector is part of a first node, the optical bus further comprising a second node similarly configured to the first node but downstream from the first node as being further away from the master transceiver in the optical bus.

19. The optical bus as defined in claim 18, wherein the optical power transmitted to the master transceiver by the first node has less power than the optical power transmitted to the master transceiver by the second node.

20. The optical bus as defined in claim 19, wherein the optical power transmission control by the first and second nodes to the master transceiver over the optical bus is adapted dynamically.

21. The optical bus as defined in claim 18, wherein optical power of the master transceiver signals transmitted to the second node is transmitted at a higher power than the optical power of the signal transmitted by the master transceiver to the first node.

22. The optical bus as defined in claim 21, wherein the optical power transmission control by the master transceiver to the first and second nodes over the optical bus is adapted dynamically.

* * * * *

UNITED STATES PATENT AND TRADEMARK OFFICE
CERTIFICATE OF CORRECTION

Page 1 of 3

PATENT NO. : 8,340,481 B2
APPLICATION NO. : 13/225212
DATED : December 25, 2012
INVENTOR(S) : Levinson It is certified that error appears in the above-identified patent and that said Letters Patent is hereby corrected as shown below:

In the Drawings:
Sheet 1, replace Fig. 2B with the figure depicted below, wherein the arrow above the Rx block has been reversed to point toward the Rx block.

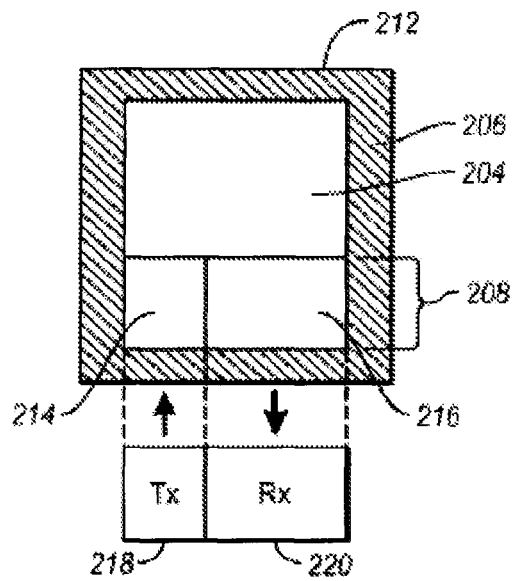

Fig. 2B

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,340,481 B2

In the Drawings:

Sheet 3, replace Fig. 3B with the figure depicted below, wherein a label reading "333" has replaced a second instance of a label reading "336".

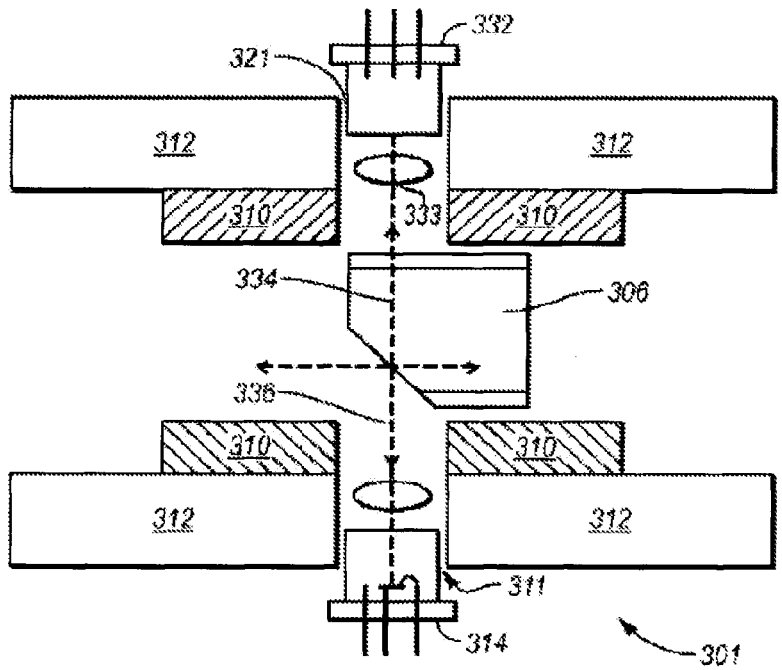

Fig. 3B

In the Specifications:

Column 1, Line 7, change "Optical Bus" to --OPTICAL BUS--

Column 2, Line 4, change "Further the" to --Further, the--

Column 3, Line 32, change "illustrates an one" to --illustrates one--
Column 3, Line 61, change "in to" to --into--

Column 4, Line 35, change "12" to --122--
Column 4, Line 61, change "fiber 101" to --optical fiber 101--
Column 4, Line 62, change "fiber 101" to --optical fiber 101--
Column 4, Line 67, change "fiber 101" to --optical fiber 101--

Column 5, Line 4, change "optical bus 100" to --bus 100--
Column 5, Line 7, change "transceiver 102" to --master transceiver 102--
Column 5, Line 15, change "2 transceivers" to --two transceivers--
Column 5, Line 17, change "fiber 101" to --optical fiber 101--
Column 5, Line 18, change "Further all" to --Further, all--
Column 5, Line 51, change "cladding 208" to --cladding 206--
Column 5, Line 57, change "207 was reflected" to --207 is reflected--
Column 5, Line 59, change "discussed above is" to --discussed above, is--

CERTIFICATE OF CORRECTION (continued)
U.S. Pat. No. 8,340,481 B2

In the Specifications:
Column 6, Line 4, change "218" to --216--
Column 6, Line 45, change "304, respectfully" to --304, respectively--

Column 7, Line 1, change "other embodiment" to --another embodiment--
Column 7, Line 5, change "an continuous" to --a continuous--
Column 7, Line 9, change "angled face 308 or mirror" to --angled face or mirror 308--
Column 7, Line 11, change "fibers 302, 306, and" to --fibers 302, 304, and--
Column 7, Line 12, change "308 are a single" to --306 are a single--
Column 7, Line 29, change "336" to --333--
Column 7, Line 38, change "optical bus along" to --optical bus, along--
Column 7, Line 52, change "embodiments enables" to --embodiment enables--

Column 8, Line 25, change "insure" to --ensure--
Column 8, Line 38, change "220" to --216--
Column 8, Line 47, delete "power"

Column 9, Line 37, change "based the configuration" to --based on the configuration--
Column 9, Line 39, change "bus 508" to --optical bus 508--
Column 9, Line 59, change "604 and 601" to --602 and 604--

In the Claims:
Column 10, Line 36, change "bi-directional" to --bidirectional--